United States Patent
Shah et al.

(10) Patent No.: US 8,484,619 B2
(45) Date of Patent: Jul. 9, 2013

(54) MULTI-VIEW DEBUGGING

(75) Inventors: Kushal Shah, Redmond, WA (US); William A. Manis, Sammamish, WA (US); Herry Sutanto, Redmond, WA (US); Matthew R. Winkler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 916 days.

(21) Appl. No.: 12/613,214

(22) Filed: Nov. 5, 2009

(65) Prior Publication Data
US 2011/0107306 A1    May 5, 2011

(51) Int. Cl.
*G06F 9/44* (2006.01)
(52) U.S. Cl.
USPC ........................................................ 717/125
(58) Field of Classification Search
USPC ........................................................ 717/125
See application file for complete search history.

(56) References Cited

U.S. PATENT DOCUMENTS

| | | | |
|---|---|---|---|
| 5,410,648 A | 4/1995 | Pazel | |
| 7,299,454 B2 | 11/2007 | Pugh | |
| 2006/0074733 A1 | 4/2006 | Shukla | |
| 2006/0288332 A1 | 12/2006 | Sagar | |
| 2008/0155330 A1 | 6/2008 | Van Wyk | |
| 2008/0177525 A1 | 7/2008 | Crawford | |
| 2009/0106739 A1 | 4/2009 | Weatherbee | |

OTHER PUBLICATIONS

Marc Brown et al., "A system for Algoirthm Animation", Jul. 1984, Computer Graphics, vol. 18, No. 3, pp. 177-186.*
Author Unknown; The New Iteration: How XAML Transforms the Collaboration between Designer and Developer in Windows Presentation Foundation—Published Date: Dec. 10, 2007; http://windowsclient.net/wpf/white-papers/thenewiteration.aspx.
Author Unknown; JViews Home Page—Published Date: May 27, 2000; http://www.cs.auckland.ac.nz/~john-g/jviews.html.
Dr. Armin B. Cremers; Developing an Interactive Software Visualization and Navigation Framework for Eclipse—Published Date: 2006; http://roots.iai.uni-bonn.de/research/svf/downloads/papers/bashar_msc_thesis_2006.pdf.
J.G. Hosking; Applying the Evolving Frameworks Pattern Language to Multi-View Software Design Tools—Retrieved Date: Oct. 20, 2009 http://www.cs.auckland.ac.nz/~john-g/papers/EFPL.pdf.

* cited by examiner

*Primary Examiner* — Wei Zhen
*Assistant Examiner* — Lanny Ung
(74) *Attorney, Agent, or Firm* — Workman Nydegger

(57) ABSTRACT

Debugging an executing process. A method includes accessing a unique key that is common to two or more different representations of a same function in the process. A runtime for the executing process is annotated with the unique key. The method further includes detecting that the function is executing. The unique key is used to provide an indication in one or more of the two or more different representations that the function is executing.

20 Claims, 2 Drawing Sheets

MULTI-VIEW DEBUGGING

BACKGROUND

Background and Relevant Art

Computers and computing systems have affected nearly every aspect of modern living. Computers are generally involved in work, recreation, healthcare, transportation, entertainment, household management, etc.

To make computing systems useful in these environments, computer applications are developed which include computer executable instructions stored in computer readable media. The instructions can be executed by one or more processors allowing the processors to control other computer hardware. Applications can be generated in a number of different ways. For example, imperative computer programming is a form of programming where computer programmers code instructions which indicate what computer hardware should do. For example, imperative instructions may directly indicate to a processor to add or compare two numbers.

Another type of programming is Declarative programming. Declarative programming allows computer programmers to specify a desired result. This can be done by specifying an activity. The activities can be connected to other activities or can be used to construct higher level activities. These activities have underlying imperative code which tells hardware what to do to accomplish the activity. Declarative coding is often done using workflows. Workflows are a type of continuation based runtime. A continuation based runtime executes activities. An activity represents a unit of executable code including multiple pulses of work. One of the ways an activity can execute multiple pulses of work is through the scheduling of child activities. This composition of activities enables custom control flows that can be implemented through the scheduling of child activities 0, 1 or n times as determined by the composite activity. An activity can also setup a resumable continuation in its execution that is resumed by a stimulus external to the runtime. The runtime interprets this external stimulus as another pulse of work to be handled by the activity. Pulses of work are represented internally as continuations that the runtime invokes on activities. Declarative coding can be represented in a number of different ways, and is often accomplished using one or more of these ways together. For example, some representations of declarative code include Xaml, Designer, Domain Specific Language (DSL), Tabular etc.

Many computer applications include large amounts of code. Further, much of this code is generated by human effort. As is well known in the computing arts, such interaction often leads to errors in the code, commonly referred to as bugs. Thus, much effort has been devoted to facilitating the removal of bugs from computer code, or debugging. Currently if there is a desire to debug an artifact, generally it is on a single design time view of the artifact. The design time representation can be, for example, Workflows, Xaml, Designer, DSL, Tabular etc. There is generally not a seamless debug engine debugging across all these views of the workflows that are executed by a single workflow runtime.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method that may be practiced in a computing environment. The method includes acts for debugging an executing process. The method includes accessing a unique key that is common to two or more different representations of a same function in the process. A runtime for the executing process is annotated with the unique key. The method further includes detecting that the function is executing. The unique key is used to provide an indication in one or more of the two or more different representations that the function is executing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
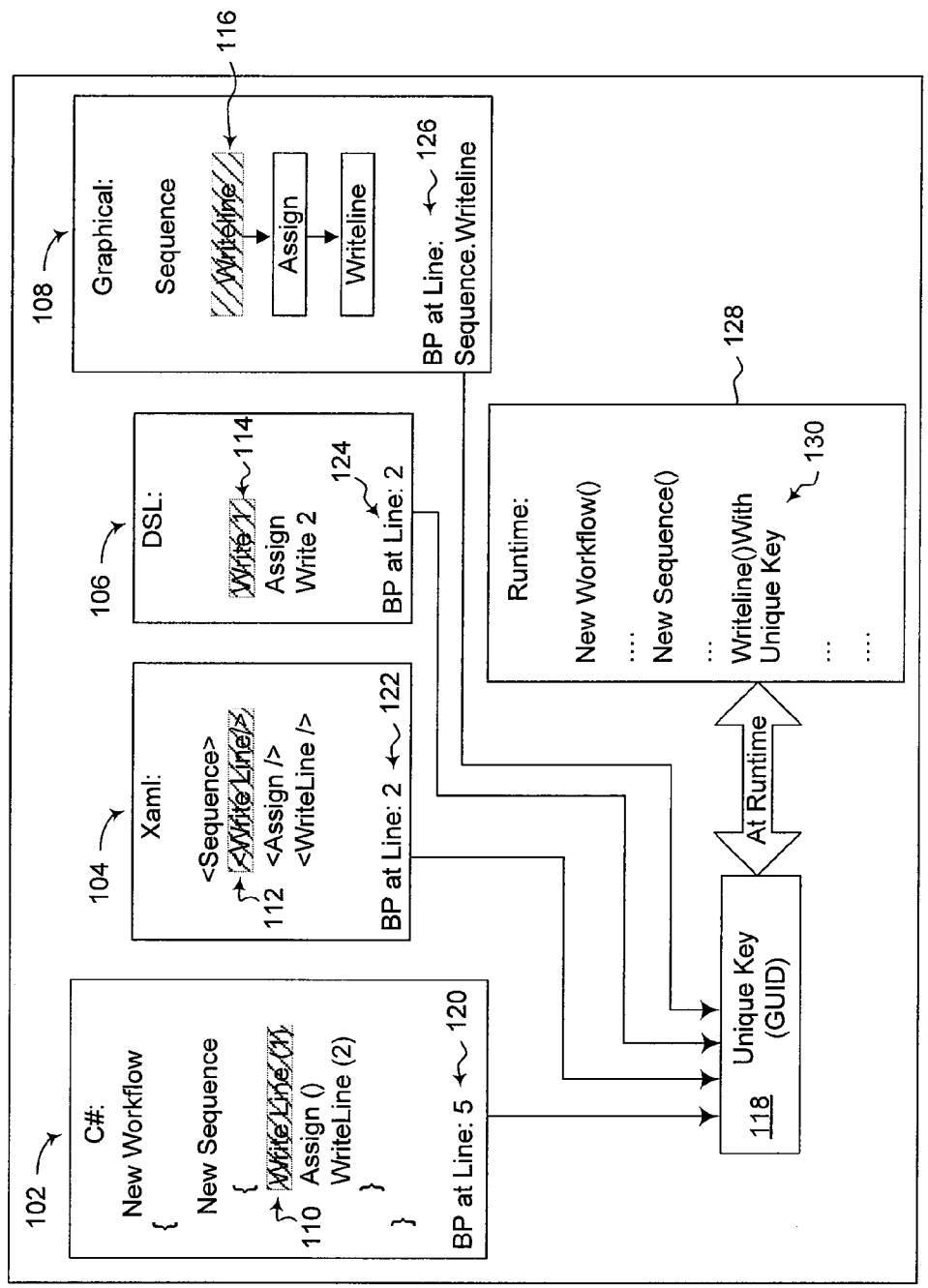
FIG. 1 illustrates various representations of a running process, and the correlation of common function representations to a unique key.

Some embodiments described herein implement functionality whereby different views or representations of executing objects can be represented together at runtime so as to allow for debugging across different views or representations of executing applications.

For every runtime, a unique key construct is created which can be used to map each executing object to the specific view requested. Conversely, given the view and the view specific construct (e.g. line number, activity identifier, tabular cell number, etc.); the unique key can be obtained.

At runtime, the unique key is embedded as part of the executing constructs such that as the key is executed, a check through the reverse look up can be made to determine if it matches to any specific view's breakpoints to break the execution. In one embodiment, the key may be included in a table structure which can be used to correlate view specific constructs with keys.

Thus, some embodiments illustrated herein include the ability to generate or utilize a function which can map executing objects between different views to a unique key such that given the unique key and the view, it is possible to obtain the corresponding view's line. Embodiments may include the ability to provide this unique key as an executing construct such that at runtime, as the construct is executed, a reverse look up can be performed for the breakpoints information specific to a view and a check can be made to determine if it is desirable to break the execution as a breakpoint hit scenario or a stepping through code scenario. A breakpoint allows a user to halt execution at a given point and inspect. Additionally, the user can instruct the runtime to execute the next statement (step next) at the current scope of execution, or the user can instruct the runtime to break at the first instruction of the call being made on the line (step into) which will move processing down to a new scope of execution (the implementation of a given command).

As the abstraction levels increase and the tools for development gain more significance, it may be useful to have domain specific views of the application code. The view can be varied including views from unmanaged/managed code to graphical views of how the application logic is structured to tabular views to the DSL view of the application where multiple lines of the code are mapped to a single line, etc.

In each of these views and domains, it should still be possible for the domain developer to be able to debug his application in his view so that he can understand the logic and fix errors before deployment and production.

To have truly multi-view debugging, embodiments implement an ability to have a seamless mapping between the different views for each of the executing object in the specific runtime. For Example, mapping one or more C#/VB lines to a cell in the tabular view to a designer item in the designer view to one dsl line can be accomplished. To achieve this, runtime specific algorithms which can generate a unique key for every runtime construct are implemented. This unique key can then map to the corresponding equivalent construct (e.g. line, cell, item, etc.) in different views.

Conversely, a reverse algorithm can be implemented, where given the view and the unique key, an output can be obtained with the view specific equivalent executing construct (e.g. line, cell, item, etc.).

With the above two algorithms, embodiments may include the ability to seamlessly move between different views while debugging to have the correct debug adornments and breakpoints shown.

The remaining piece next is how to know if a specific breakpoint has been hit or the runtime is now executing the next construct for stepping in or stepping through code behaviors. Traditionally, again the debugger and through its extensibilities offered, the breakpoints are still mapped to a specific line in the managed/unmanaged code directly or indirectly through the program database files (PDBs). Hence it is then left to the domain to then map those lines to the specific view the user/developer is interested in.

Essentially, PDBs store a mapping between the code and its equivalent binary form instructions. The breakpoints are also stored as line numbers. As the binary form instructions are executed, they know which code line they map to and if there is a breakpoint at the same location, then embodiments break the execution.

On similar lines and instead of the line numbers, embodiments are able to add in the unique key as a runtime construct so that when it executes, and through the reverse algorithms discussed above, embodiments could determine that for a specific view the breakpoint has been hit.

Referring now to FIG. 1, an example is illustrated. FIG. 1 illustrates various representations of application processes and their included functions. For example, FIG. 1 illustrates a process represented in a C# representation 102, an XML (e.g. Xaml) representation 104, a Domain Specific Language (DSL) representation 106 and as a graphical workflow sequence representation 108. FIG. 1 further illustrates different representations of same functions. For example, FIG. 1 illustrates a write function as a C# representation 110, a Xaml representation 112, a Domain Specific Language (DSL) representation 114 and as a graphical workflow sequence representation 116. FIG. 1 further illustrates a unique key 118, which in some embodiments may be a globally unique identifier (GUID) that corresponds to the function representations 110, 112, 114 and 116 irrespective of which representation is represented.

Using the unique key 118, break points (BPs) 120, 122, 124, and 126 can be set. At runtime 128, the unique key 118 is embedded as part of the executing constructs such that as the key is executed, a check through the reverse look up can be made to determine if it matches to any specific view's breakpoints to break the execution.

In alternative embodiments, the unique key can be used to allow for highlighting or other annotation in a graphical user interface. For example, FIG. 1 illustrates highlighting of representations. While FIG. 1 illustrates shading, it should be appreciated that other representations can be made including one or more representations that are highlighted, colored, pointed to, represented in a different font, represented with special characters, and/or some other indication.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed. Further, it should be understood that the methods may be practiced by a computer system including one or more processors and computer readable media such as computer memory. In particular, the computer memory may store computer executable instructions that when executed by one or more processors cause various functions to be performed, such as the acts recited in the embodiments.

Figure 2:
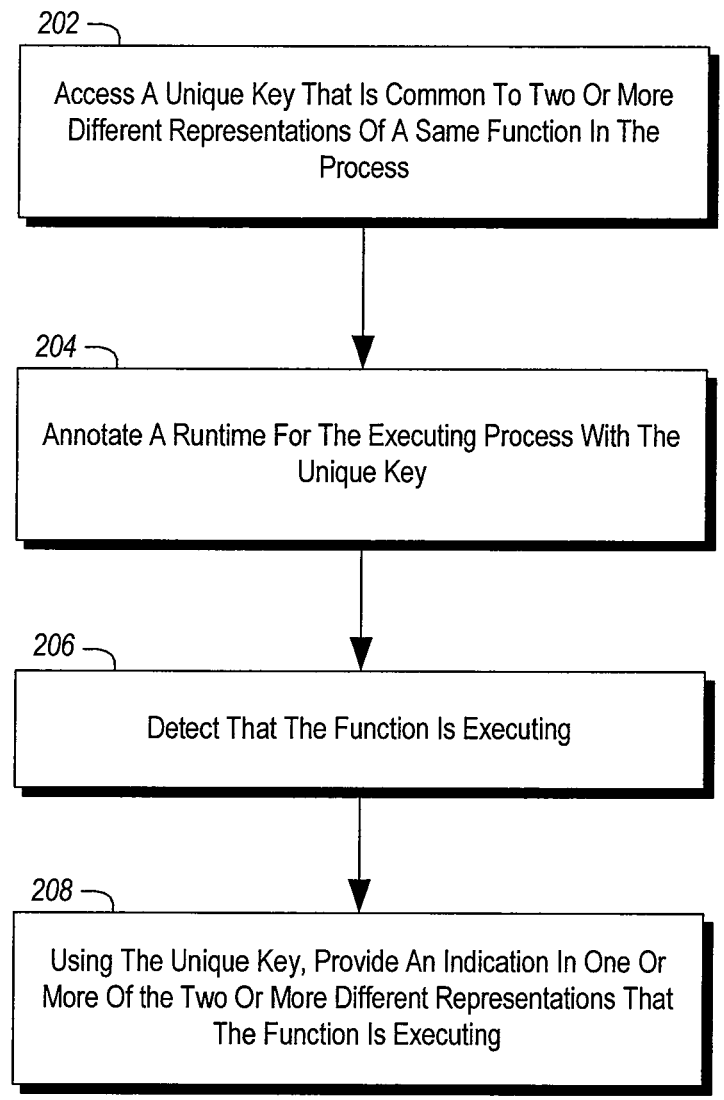
FIG. 2 illustrates a method of debugging a running process.

Referring now to FIG. 2, a method 200 is illustrated. The method 200 may be practiced in a computing environment, and includes acts for debugging an executing process. The method 200 includes accessing a unique key that is common to two or more different representations of a same function in the process (act 202). For example, as illustrated in FIG. 1, a unique key 118 is common to the function illustrated at 110, 112, 114 and 116. The method further includes annotating a runtime for the executing process with the unique key (act 204). An example of this is illustrated in FIG. 1 at the annotation 130. The method 200 further includes detecting that the function is executing (act 206). For example, debugging tools may be running with the runtime that can detect which functions are running. The method 200 further includes using the unique key, providing an indication in one or more of the two or more different representations that the function is executing (act 208). For example, a graphical user interface may include representations of process code. Within the representations, may be representations of functions. FIG. 1 illustrates such an example. As a function executes, the unique key may be executed or read as well. Then using a reverse look-up, representations of the function may be found in process representations, and may be highlighted, colored, pointed to, represented in a different font, represented with special characters, and/or some other indication.

Thus, as illustrated above, the method 200 may be practiced of where providing an indication includes providing a visual depiction in a graphical user interface that the function is executing. Further, the method 200 may be practiced where providing an indication includes, proving a graphical representation in two or more representations.

Embodiments of the method 200 may also include acts for associating unique keys with functions. For example, the method 200 may include accessing a first representation of the process, accessing a second representation of the process, and applying the unique key to both the first and second representations.

As noted previously, various different representations of a process, and included functions, can be represented. For example, embodiments of the method 200 may be practiced where representations are workflow representations. Further, embodiments allow for two or more different representations of the same process and functions to be represented together and debugged together.

The method 200 may further include setting a breakpoint in a debugger. The breakpoint identifies the unique key such that processing is halted or paused when the function corresponding to the unique key is reached.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of debugging an executing process, the method comprising:
    generating a unique key for a runtime function in the executing process, the runtime function corresponding to runtime code which is represented by at least two different representations in different domains of source code corresponding to the runtime function;
    using the unique key, storing a mapping between the source code for the runtime function and the binary form instructions for the runtime function in the executing process;
    annotating a runtime for the executing process with the unique key;
    detecting that the function is executing;
    using the unique key, providing an indication in one or more of the at least two different representations that the function is executing.

2. The method of claim 1, wherein providing an indication comprises, providing a visual depiction in a graphical user interface that the function is executing.

3. The method of claim 1, wherein providing an indication comprises, proving a graphical representation in two or more representations.

4. The method of claim 3, wherein the indication comprises one or more of highlighting, coloring, pointers, a particular font, or special characters.

5. The method of claim 1, further comprising:
accessing a first representation of the process;
accessing a second representation of the process; and
applying the unique key to both the first and second representations.

6. The method of claim 5, wherein the first representation is a workflow representation.

7. The method of claim 1, further comprising setting a breakpoint in a debugger wherein the breakpoint identifies the unique key such that processing is halted when the function corresponding to the unique key is reached.

8. In a computing environment, a computer system including functionality for debugging an executing process, the computer system comprising:
one or more processors;
one or more physical computer readable storage media, not including transmission media;
one or more computer modules implemented as computer executable instructions stored on the one or more physical computer readable storage media, that when executed by one or more processors, cause the processors to perform the following:
generate a unique key for a runtime function in the executing process, the runtime function corresponding to runtime code which is represented by two or more different representations in different domains of source code corresponding to the runtime function;
using the unique key, store a mapping between the source code for the runtime function and the binary form instructions for the runtime function in the executing process;
annotate a runtime for the executing process with the unique key;
detect that the function is executing;
using the unique key, provide an indication in one or more of the two or more different representations that the function is executing.

9. The system of claim 8, wherein providing an indication comprises, providing a visual depiction in a graphical user interface that the function is executing.

10. The system of claim 9, wherein the indication comprises one or more of highlighting, coloring, pointers, a particular font, or special characters.

11. The system of claim 8, wherein providing an indication comprises, proving a graphical representation in two or more representations.

12. The system of claim 8, wherein the one or more computer modules implemented as computer executable instructions stored on the computer readable media, that when executed by one or more processors, further cause the processors to perform the following:
access a first representation of the process;
access a second representation of the process; and
apply the unique key to both the first and second representations.

13. The system of claim 12, wherein the first representation is a workflow representation.

14. The system of claim 8, further wherein the one or more computer modules implemented as computer executable instructions stored on the computer readable media, that when executed by one or more processors, further cause the processors to set a breakpoint in a debugger wherein the breakpoint identifies the unique key such that processing is halted when the function corresponding to the unique key is reached.

15. In a computing environment, a physical computer readable storage medium, not including transmission media, comprising computer executable instructions that when executed by one or more processor cause the one or more processor to perform the following:
generate a unique key for a runtime function in the executing process, the runtime function corresponding to runtime code which is represented by two or more different representations in different domains of source code corresponding to the runtime function;
using the unique key, store a mapping between the source code for the runtime function and the binary form instructions for the runtime function in the executing process;
annotate a runtime for the executing process with the unique key;
detect that the function is executing;
using the unique key, provide an indication in one or more of the two or more different representations that the function is executing.

16. The computer readable storage medium of claim 15, wherein providing an indication comprises, providing a visual depiction in a graphical user interface that the function is executing.

17. The computer readable storage medium of claim 15, wherein providing an indication comprises, proving a graphical representation in two or more representations.

18. The computer readable storage medium of claim 17, wherein the indication comprises one or more of highlighting, coloring, pointers, a particular font, or special characters.

19. The computer readable storage medium of claim 15, further comprising computer executable instructions stored on the computer readable media, that when executed by one or more processors, further cause the processors to perform:
accessing a first representation of the process;
accessing a second representation of the process; and
applying the unique key to both the first and second representations.

20. The computer readable storage medium of claim 15, further comprising computer executable instructions stored on the computer readable media, that when executed by one or more processors, further cause the processors to set a breakpoint in a debugger wherein the breakpoint identifies the unique key such that processing is halted when the function corresponding to the unique key is reached.

* * * * *